J. Ahearn,
Plow Fender.
No. 92,772.  Patented July 20, 1869.
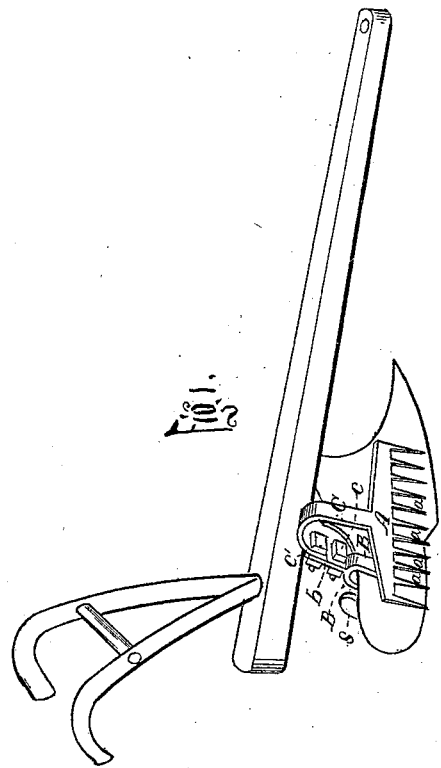
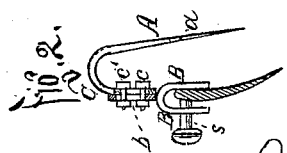
Witnesses:
C. A. Pettit
A. M. Tanner
Inventor:
J. Ahearn
by Munn & Co.
Attorneys.

UNITED STATES PATENT OFFICE.

JOHN AHEARN, OF BALTIMORE, MARYLAND.

IMPROVEMENT IN PLANT-PROTECTOR ATTACHMENT TO PLOWS.

Specification forming part of Letters Patent No. 92,772, dated July 20, 1869.

*To all whom it may concern:*

Be it known that I, JOHN AHEARN, of the city and county of Baltimore, and State of Maryland, have invented a new and Improved Plant-Protector Attachment to Plows; and I do hereby declare that the following is a full, clear, and exact description of the construction and operation of the same, reference being had to the accompanying drawings, making a part of this specification, in which—

Figure 1 is a perspective view. Fig. 2 is a cross-section.

The object of this invention is to provide for public use a simple and convenient adjustable device, which can be readily attached to the mold-board of any form of plow, to prevent the dirt, lumps of clay, &c., from being thrown by said mold-board upon the plant.

In the drawings, A represents a guard-plate in the form of a rake-head or comb, having teeth $a\ a\ a$, arranged as shown. B is a clasp or socket fitting over the edge of the mold-board and capable of being fastened thereto by means of a clamping-screw, $s$. $b$ is a shank or straight flat arm projecting upward from the clasp or socket B. C is the flat curved tang or shank of the guard A, so constructed as to fit against the arm $b$, and be readily fastened thereto by means of set-screws $c\ c'$, as will be readily understood from the drawings.

It is not essential that the parts $c\ b$ should be flat, nor that they should simply fit against each other, as shown. One of them may be hollow, fitting over the end of the other, and they may be made round, square, or polygonal, so as to hold the more firmly in any position in which they may be set.

In order to adjust the part A nearer to or farther from the mold-board, the shank C may, when the parts $b\ c$ are made flat, be fastened upon one or the other side of the arm $b$; and, to still further increase its adjustability, washers may be introduced between the parts $b\ c$.

Having thus described my invention, what I claim as new, and desire to secure by Letters Patent, is—

1. As an article of manufacture, an independent plant-guard, A, connected to a socket, B, which can be fastened upon the edge of a plow mold-board, substantially as and for the purpose described.

2. The combination of the parts A B $s\ b\ $C $c\ c$, constructed to operate in connection with each other, substantially in the manner and for the purposes specified.

3. In a device having a guard-plate, A, and a socket, B, for the purposes referred to, making the guard-plate adjustable toward and from the mold-board, substantially as and for the purposes specified.

JOHN AHEARN.

Witnesses:
 JACOB BURROUGH,
 W. EDWIN FARQUHARSON.